United States Patent [19]

Hedin et al.

[11] Patent Number: 4,559,445
[45] Date of Patent: Dec. 17, 1985

[54] WIDE ANGLE OPTICAL TRANSMITTER/RECEIVER

[75] Inventors: Raymond C. Hedin, Apple Valley; Fred G. Hewitt, Eagan, both of Minn.

[73] Assignee: The United States of America as represented by the Secretary of the Air Force, Washington, D.C.

[21] Appl. No.: 538,879

[22] Filed: Oct. 4, 1983

[51] Int. Cl.$^4$ ............................................. G01J 1/20
[52] U.S. Cl. ..................................... 250/203 R; 356/5
[58] Field of Search ................. 250/203 R, 203 CT; 356/5, 152, 28; 244/3.16, 3.17

[56] References Cited

U.S. PATENT DOCUMENTS

| | | | |
|---|---|---|---|
| 3,849,742 | 11/1974 | Hughes et al. | 332/7.51 |
| 3,939,342 | 2/1976 | Bezerie et al. | 250/203 R |
| 4,025,194 | 5/1977 | Teppo | 356/5 |
| 4,143,263 | 3/1979 | Eichweber | 250/199 |
| 4,148,584 | 4/1979 | Roelants | 356/5 |
| 4,168,908 | 9/1979 | Cubalchini | 250/203 R |
| 4,270,862 | 6/1981 | Hewitt | 356/5 |

Primary Examiner—David C. Nelms
Assistant Examiner—J. Jon Brophy
Attorney, Agent, or Firm—Donald J. Singer; Bobby D. Scearce

[57] ABSTRACT

A novel optical transmitter/receiver device is described which comprises a source of radiation providing a collimated coherent light beam, such as a laser beam, along a first optical axis; a magneto-optic light deflector device controllably deflecting the beam off the first optical axis in the direction of a target; optical beam expander and collimating lenses transmitting the expanded beam toward the target and receiving the expanded and reflected beam from the target; the reflected beam then being deflected back along the first optical axis to a scraper mirror which optically turns the reflected beam along a viewing axis toward a photo detector.

5 Claims, 3 Drawing Figures

WIDE ANGLE OPTICAL TRANSMITTER/RECEIVER

RIGHTS OF THE GOVERNMENT

The invention described herein may be manufactured and used by or for the Government of the United States for all governmental purposes without the payment of any royalty.

BACKGROUND OF THE INVENTION

The present invention relates generally to optical transmit/receive devices, and more particularly to a novel optical scanning/tracking system utilizing a laser. Specifically, the present invention comprises a wide-angle laser transmit/receive system particularly useful for target acquisition utilizing a directed laser beam.

Existing optical transmit/receive systems utilizing a laser include a mechanical subsystem of moveable gimbal mounted mirrors to aim the laser beam at a target and to position the receiver optics for receiving feedback. The mechanical subsystems characterizing existing systems necessarily require close tolerance manufacture, assembly and alignment of component parts, and are susceptible to misalignment under the influence of the variable g forces induced by an accelerating coordinate system characteristic of, for example, an operating missile.

The present invention provides an optical transmit/receive system utilizing a directed light beam, such as a low power laser beam, for use in a ranging device, missile guidance system, target recognition and identification system, tracking device or the like. The optical steering system comprising the present invention utilizes a magneto-optic stripe domain grating device to deflect a laser beam into a two-dimensional field of view. The system provides beam transmission over a wide field of view and includes a detector and associated receiver optics having a narrow effective field of view thereby limiting background noise while maintaining a wide overall field of view. The laser steering is accomplished electronically without the use of mechanical steering devices.

It is, therefore, a principal object of the present invention to provide an improved opical transmitter/receiver device.

It is a further object of the invention to provide an optical tracking device characterized in structure and operation by electronic steering of a directed laser beam and of the receiver optics without the use of mechanical steering devices.

These and other objects of the present invention will become apparent as the detailed description of certain representative embodiments thereof proceeds.

SUMMARY OF THE INVENTION

In accordance with the foregoing principles and objects of the present invention, a novel optical transmitter/receiver device is described which comprises a source of radiation providing a collimated coherent light beam, such as a laser beam, along a first optical axis; a magneto-optic light deflector device controllably deflecting the beam off the first optical axis in the direction of a target; optical beam expander and collimating lenses transmitting the expanded beam toward the target and receiving the expanded and reflected beam from the target; the reflected beam then being deflected back along the first optical axis to a scraper mirror which optically turns the reflected beam along a viewing axis toward a photo detector.

DESCRIPTION OF THE DRAWINGS

The present invention will be more clearly understood from the following detailed description of certain representative embodiments thereof read in conjunction with the accompanying drawings wherein.

DETAILED DESCRIPTION

Figure 1:
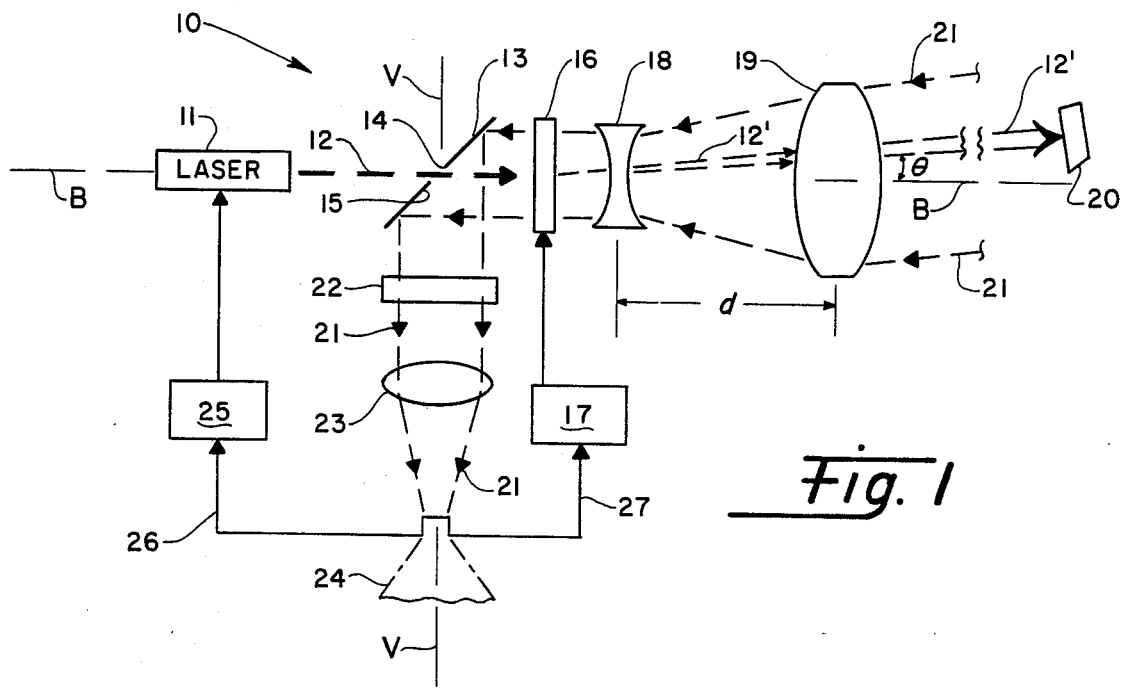
FIG. 1 is a schematic plan view of the laser transmit/receive system of the present invention.

Referring now to FIG. 1, shown therein is a schematic plan view of the novel transmitter/receiver system 10 of the present invention. A source of suitaly collimated coherent radiation may be provided to direct a light beam along an optical axis B. In the system 10 constructed in demonstration of the invention, a low power laser 11 of the helium-neon (HeNe) type was used, and provided a transmit laser beam 12 at about 0.05 watt and a wavelength of about 0.6328 micron along the beam axis B substantially as shown in FIG. 1. A scraper/folding mirror 13 was disposed along beam axis B and positioned at an angle thereto (e.g., 45°) to define a viewing axis V intersecting beam axis B (preferably at a right angle thereto substantially as shown). Mirror 13 included a central hole 14 of suitably small size and concentric with beam axis B for passage therethrough of transmit beam 12. Mirror 13 included a substantially flat, totally reflective surface 15 for folding light reflected off a target and received by the system 10 along viewing axis V as shown in the figures and hereinafter described.

A crystal deflector 16 was disposed along beam axis B as shown in FIG. 1 to deflect beam 12 in the direction of a target. Deflector 16 was in the form of a magneto-optic light diffraction grating of substantially conventional structure. Briefly, the deflector 16 comprises a diffraction grating which can be controlled, e.g., by controller 17 shown schematically, in both grating spacing and orientation (about the beam axis B) through the application external magnetic fields. Deflector 16 was thus capable of selectively steering a beam 12 over a two-dimensional angular field of view $\theta$ of about ±19° relative to beam axis B.

Beam expander 18, which may be in the form of a double concave lens as shown, was provided to expand collimated beam 12 to a desired beam size and served to reduce beam 12 divergence for long range target acquisition applications. Objective lens 19 was provided to collimate the expanded, deflected beam 12' toward a target 20. Return beam 21, reflected from target 20, travels along the same axis as that along which beam 12' is transmitted, i.e., along a beam axis deflected by $\theta$ from beam axis B. The deflector 16, through the reciprocity principle, therefore bends return beam 21 back along beam axis B. Mirrored surface 15 of mirror 13 was positioned to reflect expanded return beam 21 along viewing axis V through a narrow band interference filter 22 to remove noise in the form of extraneous light received by the system. The beam 21 was then focused by lens 23 onto detector 24 which may preferably be in the form of an avalanche photodiode detector for desirably high sensitivity. The receiver optics, represented by filter 22 and lens 23, effectively cause light entering the system off the axis of transmit beam 12′ and return beam 21 to be imaged off the detector 24 and therefore to be ignored.

In the operation of the transmit/receive system 10 of the present invention deflector 16 is conditioned (through the imposition of a suitable magnetic field via controller 17) to deflect laser beam 12 in the direction of target 20. Laser 11 is then triggered, as by laser activation/controller means 25, to direct beam 12 toward target 20. Light reflecting off target 20 in the form of return beam 21 is detected by detector 24 as aforesaid. By providing suitable controls on deflector 16, as through controller 17, transmit beam 12′ may be selectively controlled to "search" the effective field of view of system 10 (represented by the limits of $\theta$). Accordingly, detector 24, laser controller 25 and deflector controller 17 may be suitably interconnected electronically (as through connecting/feedback means 26,27) to selectively search the field of view for a target 20.

The characteristics of the optical transmit/receive system 10 of the present invention may be best understood through reference to simplified analytical models representative, respectively, of the transmit optics and receive optics comprising system 10.

The first consideration for operation of system 10 is that the transmit beam 12 exit the system 10 as an expanded, coherent, collimated beam 12′. This condition will be satisfied for the transmit optics (represented by beam expander 18 and objective lens 19) by suitable selection of focal lengths and spacing between these two elements. Referring again to FIG. 1, representative transmit/receive optics may comprise an objective lens 19 having a focal length $f_1$ and beam expander 18 having a focal length $f_2$. The expression for the focal length f of the combined system consisting of elements 18,19 is as follows:

$$1/f = (1/f_1) + (1/f_2) - (d/f_1 f_2)$$

where d is the spacing between expander 18 and lens 19 along axis B. For the transmit beam 12′ to be collimated, the combined focal length f is infinite or 1/f is zero. Then, solving for d.

$$d = f_1 + f_2 \text{ (for } 1/f = 0\text{)}$$

This configuration for elements 18,19, essentially a Galilean telescope, is the most compact arrangement to provide the desired transmit beam 12′, since the focal length $f_2$ of beam expander 18 is negative.

A second consideration of importance to the operation of the transmit/receive system 10 of FIG. 1 is the field of view defined by the transmit/receive optics comprising the system 10. The magneto-optic crystal deflector 16 determines from which direction (angle $\theta$) a return beam 21 will be accepted, i.e., determines the receiver look angle ($2\theta$). However, the instantaneous, or effective field of view of the receive optics (i.e., in combination, elements 16, 18, 19, 22 and 23) is limited by the size of the detector 24 aperture in combination with the focal length of lens 23.

Figure 2:
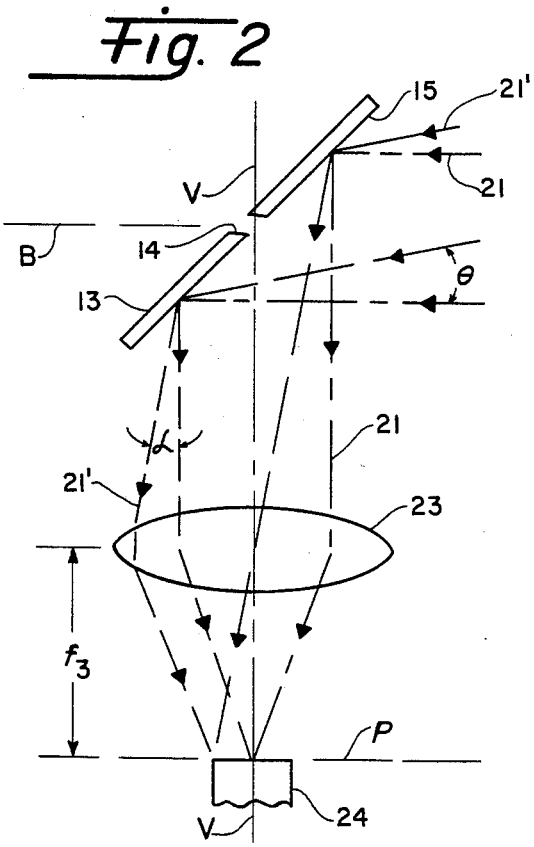
FIG. 2 schematically presents the receive optics.
Figure 3:
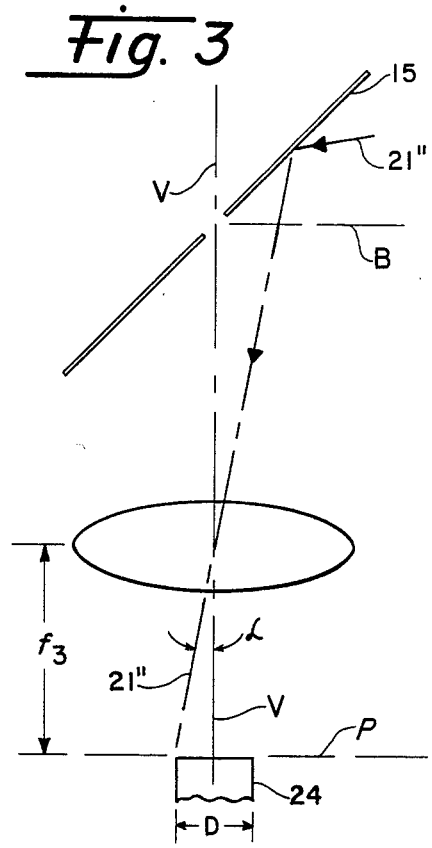
FIG. 3 schematically illustrates the receiver field of view.

This is best illustrated by reference to FIG. 2 showing on somewhat enlarged scale detector 24 and associated lens 23 together with the parameters determinative of the effective field of view. Returning light rays comprising return beam 21 which are parallel to the beam axis B are reflected by turning mirror 13 along viewing axis V and are focused onto focal plane P near the center of detector 24. Off axis rays 21′ are focused at some other point in the focal plane P, dependent upon their angle of incidence relative to beam axis B, up to the limit of angle $\alpha$ beyond which the rays of return beam 21′ are no longer focused onto detector 24 by lens 23 and are therefore not detected. The angle $\alpha$, the half angle of the effective field of view of detector 24, is determined by the focal length $f_3$ of lens 23. The effective field of view $\alpha$ of the receive optics may be determined by considering a ray 21″ passing through the center of lens 23 as suggested in FIG. 3. Ray 21″ passes through the lens 20 unperturbed, and, therefore, the angle $\alpha$ characterizing the maximum degree to which ray 21″ may deviate from axis B (or axis V) and be detected by detector 24, is given by the expression, $$\tan \alpha = \tfrac{1}{2}(D/f_3)$$

or, $$\alpha = \tan^{-1}(D/2f_3)$$

where D is the effective width of the detector 24 aperture. Using a value for $f_3$ of 30 mm and commercially available detectors, such as those incorporating photodiodes, D characteristically ranged from about 0.25 to 0.5 mm, and therefore $\alpha$ was about 4 to 8 milliradians and $2\alpha$ ranged up to about 16 milliradians.

The optical system 10 of the present invention, in the representative embodiment, just described, possesses several attributes distinguishing it from existing systems of similar function. The present invention is a wide-angle, large-aperture receiver with an effective narrow field of view. This is achieved by locating the detector 24 behind the magneto-optic deflector device 16. Placing the detector 24 behind the deflector 16 takes advantage of the reciprocity of the system 10, i.e., when a beam 12 is deflected in a specific direction by the system, a return beam 21 from that direction into the system will be deflected back along the original optical axis (B). System 10 in the configuration described collects only the light which is substantially parallel to the axis of the transmitted beam, and rejects light which is not, and therefore exhibits a very narrow effective field of view, greatly reducing background noise while maintaining a wide overall field of view. System 10 exhibits several advantages over existing systems. First, the receiving aperture is determined by the optics in front of the deflector 16, not by the deflector itself. Thus, a large aperture magneto-optic device 16 is not required in order to have a large receiver aperture. Second, light, though returning from a wide off-axis angle is bent back along axis B within a narrow angle, of the order of about 10 mr, so that a very narrow optical filter 22 can be used. A filter with a passband of 1 nm or less is acceptable, and the aperture requirement of this filter is also reduced. And third, the system provides a narrow effective field of view for the detector 16 while maintaining a wide "look" angle.

The present invention, as hereinabove described, provides a novel optical transmit/receive system capable of steering a laser beam and the look angle of the receiving optics, without the use of mechanical steering devices, and of maintaining a narrow effective field of view for background noise suppression. It is understood that certain modifications to the invention as herein described may be made, as might occur to one with skill in the field of the invention, within the scope of the appended claims. For example, it may be desirable to utilize lens combinations in place of the single lens elements described and illustrated herein to allow for aberrations and distortions in the optical elements. Therefore, all embodiments contemplated hereunder have not been shown in complete detail. Other embodiments may be developed without departing from the spirit of this invention or from the scope of the appended claims.

We claim:

1. An optical system for directing a transmitted light beam toward a target and receiving a reflected beam therefrom, comprising:
   a. a source of radiation providing a coherent collimated light beam directed along a first optical axis;
   b. a scraper mirror, magneto-optic light deflector means, optical beam expander, and collimating lens disposed along said first optical axis intermediate said source and target;
   c. said scraper mirror having a central hole concentric with said first optical axis for transmission of said light beam toward said deflector means, beam expander, lens and target, said mirror being inclined relative to said first optical axis to reflect said reflected beam along a second optical axis intersecting said first optical axis at said hole;
   d. said deflector means comprising a thin ferromagnetic film having a plurality of parallel stripe domains therein forming a light diffraction grating, said deflector means being responsive to an applied magnetic field for controllably deflecting said light beam off said first optical axis in the direction of said target;
   e. said optical beam expander disposed near said deflector means for expanding said deflected light beam to a predetermined beam size;
   f. said collimating lens disposed in predetermined spaced relationship to said beam expander for collimating said expanded light beam, transmitting said beam in the direction of said target, and receiving said reflected beam from said target;
   g. said beam expander and deflector means deflecting said return beam along said first optical axis to said scraper mirror; and
   h. detector means, disposed along said optical second axis for detecting said reflected beam.

2. The optical system as recited in claim 1 further comprising an optical filter disposed along said second optical axis, intermediate said mirror and said detector, for filtering from said return beam extraneous light received by said collimating lens and beam expander.

3. The optical system as recited in claim 2 further comprising a focusing lens intermediate said filter and said detector for focusing said return beam onto said detector.

4. The optical system as recited in claim 1 further comprising means for applying a magnetic field to said deflector means for controllably deflecting said light beam in the direction of said target.

5. The optical system as recited in claim 1 wherein said beam expander comprises a concave lens.

* * * * *